US007034709B2

(12) United States Patent
Young et al.

(10) Patent No.: US 7,034,709 B2
(45) Date of Patent: Apr. 25, 2006

(54) VEHICLE OCCUPANT SENSING SYSTEM AND METHOD OF ELECTRICALLY ATTACHING A SENSOR TO AN ELECTRICAL CIRCUIT

(75) Inventors: Oliver Young, Grosse Pointe Farms, MI (US); John F. Nathan, White Lake Township, MI (US); Christopher T. Ricard, Rochester, MI (US)

(73) Assignee: Lear Corporation, Southfield, MI (US)

( * ) Notice: Subject to any disclaimer, the term of this patent is extended or adjusted under 35 U.S.C. 154(b) by 135 days.

(21) Appl. No.: 10/748,514

(22) Filed: Dec. 30, 2003

(65) Prior Publication Data

US 2004/0262958 A1 Dec. 30, 2004

Related U.S. Application Data

(63) Continuation-in-part of application No. 10/606,649, filed on Jun. 26, 2003.

(51) Int. Cl.
*B60R 21/01* (2006.01)

(52) U.S. Cl. ............... 340/667; 180/273; 280/735; 177/210 EM; 324/207.2

(58) Field of Classification Search ........ 340/665–667; 280/735; 701/45; 73/862.041–862.046; 180/273; 177/210 EM; 324/207.2
See application file for complete search history.

(56) References Cited

U.S. PATENT DOCUMENTS

| 5,404,128 A | 4/1995 | Ogino et al. ............. 340/425.5 |
| 5,413,378 A | 5/1995 | Steffens, Jr. et al. ........ 280/735 |
| 5,474,327 A | 12/1995 | Schousek ..................... 280/735 |
| 5,485,000 A | 1/1996 | Schneider .................... 235/494 |
| 5,570,903 A | 11/1996 | Meister et al. .............. 280/735 |
| 5,594,222 A | 1/1997 | Caldwell ..................... 200/600 |
| 5,653,462 A | 8/1997 | Breed et al. ................. 280/735 |
| 5,694,320 A | 12/1997 | Breed .................. 364/424.055 |
| 5,731,781 A | 3/1998 | Reed .......................... 342/135 |
| 5,739,757 A | 4/1998 | Gioutsos ..................... 340/667 |
| 5,748,473 A | 5/1998 | Breed et al. .......... 364/424.055 |
| 5,810,392 A | 9/1998 | Gagnon ...................... 280/735 |
| 5,822,707 A | 10/1998 | Breed et al. ................... 701/49 |
| 5,829,782 A | 11/1998 | Breed et al. ................. 280/735 |
| 5,835,613 A | 11/1998 | Breed et al. ................. 382/100 |
| 5,848,802 A | 12/1998 | Breed et al. ................. 280/735 |
| 5,877,677 A | 3/1999 | Fleming et al. ............. 340/436 |

(Continued)

FOREIGN PATENT DOCUMENTS

EP 0 689 967 A1 3/1996

(Continued)

*Primary Examiner*—Jeffery Hofsass
*Assistant Examiner*—Anne V. Lai
(74) *Attorney, Agent, or Firm*—Bill Panagos

(57) ABSTRACT

A vehicle occupant sensing system for detecting a condition of a vehicle seat. The system includes a circuit carrier, an electric circuit with a plurality of leads, and at least one sensor that has a plurality of terminals. Also, the system includes a plurality of conductive connectors associated with the corresponding terminals and leads. The connectors each include a body disposed for electrical communication with the associated terminal and include at least one deformable blade. The blade extends into the circuit carrier and into electrical communication with the associated lead of the circuit, thereby mechanically attaching the conductive connector to the carrier while providing electrical communication between the sensor and the circuit. Also included is a method of manufacturing the same. By piercing the carrier and the circuit, the blade establishes a more robust mechanical and electrical connection for the sensor, thereby increasing the operating life of the system.

8 Claims, 4 Drawing Sheets

U.S. PATENT DOCUMENTS

| | | | | |
|---|---|---|---|---|
| 5,890,758 | A | 4/1999 | Pone et al. | 297/15 |
| 5,901,978 | A | 5/1999 | Breed et al. | 280/735 |
| 5,931,254 | A | 8/1999 | Loraas et al. | 180/272 |
| 5,931,527 | A | 8/1999 | D'Onofrio et al. | 297/146 |
| 5,943,295 | A | 8/1999 | Varga et al. | 367/99 |
| 5,954,398 | A | 9/1999 | Namba et al. | 297/257 |
| 5,971,432 | A | 10/1999 | Gagnon et al. | 280/735 |
| 5,975,612 | A | 11/1999 | Macey et al. | 296/66 |
| 6,012,007 | A | 1/2000 | Fortune et al. | 701/45 |
| 6,020,812 | A | 2/2000 | Thompson et al. | 340/438 |
| 6,027,138 | A | 2/2000 | Tanaka et al. | 280/735 |
| 6,030,038 | A | 2/2000 | Namba et al. | 297/257 |
| 6,039,139 | A | 3/2000 | Breed et al. | 180/271 |
| 6,043,743 | A | 3/2000 | Saito et al. | 340/562 |
| 6,045,405 | A | 4/2000 | Geltsch et al. | 439/620 |
| 6,056,079 | A | 5/2000 | Cech et al. | 180/273 |
| 6,059,358 | A | 5/2000 | Demick et al. | 297/188.04 |
| 6,078,854 | A | 6/2000 | Breed et al. | 701/49 |
| 6,079,763 | A | 6/2000 | Clemente | 296/65.05 |
| 6,081,757 | A | 6/2000 | Breed et al. | 701/45 |
| 6,088,640 | A | 7/2000 | Breed | 701/45 |
| 6,089,641 | A | 7/2000 | Mattarella et al. | 296/64 |
| 6,101,436 | A | 8/2000 | Fortune et al. | 701/45 |
| 6,102,463 | A | 8/2000 | Swanson et al. | 296/37.15 |
| 6,116,639 | A | 9/2000 | Breed et al. | 280/735 |
| 6,129,168 | A * | 10/2000 | Lotito et al. | 180/273 |
| 6,129,404 | A | 10/2000 | Mattarella et al. | 296/65.09 |
| 6,134,492 | A | 10/2000 | Breed et al. | 701/49 |
| 6,138,067 | A | 10/2000 | Cobb et al. | 701/45 |
| 6,141,432 | A | 10/2000 | Breed et al. | 382/100 |
| 6,168,198 | B1 | 1/2001 | Breed et al. | 280/735 |
| 6,186,537 | B1 | 2/2001 | Breed et al. | 280/735 |
| 6,220,627 | B1 | 4/2001 | Stanley | 280/735 |
| 6,234,519 | B1 | 5/2001 | Breed | 280/735 |
| 6,234,520 | B1 | 5/2001 | Breed et al. | 280/735 |
| 6,242,701 | B1 | 6/2001 | Breed et al. | 177/144 |
| 6,250,671 | B1 | 6/2001 | Osmer et al. | 280/735 |
| 6,250,672 | B1 | 6/2001 | Ryan et al. | 280/735 |
| 6,253,134 | B1 | 6/2001 | Breed et al. | 701/49 |
| RE37,260 | E | 7/2001 | Varga et al. | 367/99 |
| 6,254,127 | B1 | 7/2001 | Breed et al. | 280/735 |
| 6,270,116 | B1 | 8/2001 | Breed et al. | 280/735 |
| 6,279,946 | B1 | 8/2001 | Johnson et al. | 280/734 |
| 6,283,503 | B1 | 9/2001 | Breed et al. | 280/735 |
| 6,323,444 | B1 | 11/2001 | Aoki | 177/144 |
| 6,324,453 | B1 | 11/2001 | Breed et al. | 701/45 |
| 6,325,414 | B1 | 12/2001 | Breed et al. | 280/735 |
| 6,330,501 | B1 | 12/2001 | Breed et al. | 701/49 |
| 6,342,683 | B1 | 1/2002 | Aoki et al. | 177/144 |
| 6,353,394 | B1 | 3/2002 | Maeda et al. | 340/667 |
| 6,393,133 | B1 | 5/2002 | Breed et al. | 382/100 |
| 6,394,490 | B1 | 5/2002 | Osmer et al. | 280/735 |
| 6,397,136 | B1 | 5/2002 | Breed et al. | 701/45 |
| 6,407,347 | B1 | 6/2002 | Blakesley | 177/144 |
| 6,412,813 | B1 | 7/2002 | Breed et al. | 280/735 |
| 6,416,080 | B1 | 7/2002 | Gillis et al. | 280/735 |
| 6,422,595 | B1 | 7/2002 | Breed et al. | 280/735 |
| 6,442,465 | B1 | 8/2002 | Breed et al. | 701/45 |
| 6,442,504 | B1 | 8/2002 | Breed et al. | 702/173 |
| 6,445,988 | B1 | 9/2002 | Breed et al. | 701/45 |
| 6,452,870 | B1 | 9/2002 | Breed et al. | 367/99 |
| 6,457,545 | B1 | 10/2002 | Michaud et al. | 180/272 |
| 6,474,739 | B1 | 11/2002 | Lagerweij | 297/341 |
| 6,476,514 | B1 | 11/2002 | Schondorf | 307/10.1 |
| 6,506,069 | B1 | 1/2003 | Babala et al. | 439/248 |
| 6,605,877 | B1 | 8/2003 | Patterson et al. | 307/10.1 |
| 6,609,054 | B1 | 8/2003 | Wallace | 701/45 |
| 2002/0003345 | A1 | 1/2002 | Stanley et al. | 280/735 |
| 2002/0056975 | A1 | 5/2002 | Yoon et al. | 280/735 |
| 2002/0079728 | A1 | 6/2002 | Tame | 297/344.1 |
| 2002/0098730 | A1 | 7/2002 | Babala et al. | 439/248 |
| 2002/0195807 | A1 | 12/2002 | Ishida | 280/735 |
| 2003/0040858 | A1 | 2/2003 | Wallace | 701/45 |
| 2003/0071479 | A1 | 4/2003 | Schaller et al. | 296/136 |
| 2003/0090133 | A1 | 5/2003 | Nathan et al. | 297/217.3 |
| 2003/0106723 | A1 | 6/2003 | Thakur et al. | 177/144 |
| 2003/0111276 | A1 | 6/2003 | Kajiyama | 177/144 |
| 2003/0164715 | A1 | 9/2003 | Lester | 324/661 |
| 2003/0171036 | A1 | 9/2003 | Aujla et al. | 439/660 |
| 2003/0189362 | A1 | 10/2003 | Lichtinger et al. | 297/217.3 |
| 2003/0196495 | A1 | 10/2003 | Saunders et al. | 73/862.041 |
| 2003/0220766 | A1 * | 11/2003 | Saunders et al. | 702/173 |
| 2004/0262960 | A1 * | 12/2004 | Young et al. | 297/217.3 |
| 2005/0093276 | A1 * | 5/2005 | Hayes et al. | 280/735 |

FOREIGN PATENT DOCUMENTS

| | | |
|---|---|---|
| WO | WO 98/41424 | 3/1997 |

* cited by examiner

VEHICLE OCCUPANT SENSING SYSTEM AND METHOD OF ELECTRICALLY ATTACHING A SENSOR TO AN ELECTRICAL CIRCUIT

CROSS-REFERENCE TO RELATED APPLICATIONS

This application is a continuation-in-part of U.S. Ser. No. 10/606,649, entitled "Encapsulated Spring Sensor Assembly" and filed Jun. 26, 2003.

BACKGROUND OF INVENTION

1. Field of the Invention

The present invention relates generally to a vehicle occupant sensing system having a plurality of sensors electrically connected to a circuit used to communicate between the sensor and an ECU. In addition, the present invention relates to a method of electrically attaching the sensor to the circuit.

2. Description of Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the airbags were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that are capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause the occupant.

It can be appreciated that these occupant sensing systems provide valuable data, allowing the vehicle safety systems to function more effectively to reduce injuries to vehicle occupants.

One necessary component of each of the known systems discussed above includes some means for sensing a condition of the seat, such as whether or not it is occupied or whether the occupant is sitting in a certain position. One such sensing means may include a sensor device supported within the lower seat cushion of the vehicle seat. For example, U.S. published patent application having U.S. Ser. No. 10/249,527 and Publication No. US2003/0196495 A1, filed in the name of Saunders et al., discloses a method and apparatus for sensing seat occupancy including a sensor/emitter pair that is supported within a pre-assembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also electrically connected to a flexible circuit and supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor that is electrically connected to the flexible circuit, and the processor receives the sensor signals and interprets the signals to produce an output to indicate the presence of an occupant in the seat.

While the Saunders et al. occupant seat sensing system teaches a sensor/emitter pair that may sense the presence of a vehicle seat occupant, it suffers from certain disadvantages. Specifically, the electrical connection used to operatively establish electrical communication between the sensors and the flexible circuit is delicate and therefore fragile. The sensor system is subject to forces that are generated by occupants of various weights. These forces can act to break or otherwise disrupt the electrical connection between the circuit and the sensor. Also, sensor systems are typically subject to extreme temperatures, exposure to corrosives, and long operating lifetimes, and these operating conditions can increase the likelihood of electrical disconnection between the circuit and the sensor. Accordingly, there remains a need in the art for a vehicle occupant sensing system that includes a plurality of sensors electrically connected to an electrical circuit in a robust fashion such that the system can withstand the complex, fluctuating forces and extreme operating conditions that a vehicle seat typically endures.

SUMMARY OF INVENTION

The present invention overcomes the disadvantages of the related art in a vehicle occupant sensing system for detecting a condition of a vehicle seat. The system includes a circuit carrier and an electric circuit supported by the circuit carrier. The electric circuit presents a plurality of leads. The system also includes at least one sensor operatively supported by the circuit carrier. The at least one sensor includes a plurality of terminals corresponding to the plurality of leads presented by the electric circuit. Also, the system includes a plurality of conductive connectors associated with the corresponding plurality of terminals and leads. The conductive connectors each include a body disposed for electrical communication with the associated terminal and include at least one deformable blade. The at least one deformable blade extends into the circuit carrier and into electrical communication with the associated lead of the electric circuit, thereby mechanically attaching the conductive connector to the circuit carrier while providing electrical communication between the at least one sensor and the electric circuit. This embodiment of the vehicle occupant sensing system may be employed in a vehicle seat to detect a condition of the vehicle seat.

Another aspect of the present invention is a method of manufacturing a vehicle occupant sensing system for detecting a condition of a vehicle seat. The vehicle occupant sensing system includes a circuit carrier and an electric circuit supported by the circuit carrier. The electric circuit presents a plurality of leads. The vehicle occupant sensing system also includes at least one sensor operatively supported by the circuit carrier adapted to detect the condition of the vehicle seat. The at least one sensor includes a plurality of terminals corresponding to the plurality of leads presented by the electric circuit. Also, the vehicle occupant sensing system includes a plurality of conductive connectors associated with the corresponding plurality of terminals and leads. The conductive connectors each include a body disposed for electrical communication with the associated terminal and include at least one deformable blade. The method of manufacturing involves the step of extending the at least one deformable blade into the circuit carrier and into electrical communication with the associated lead of the electric circuit, thereby mechanically attaching the conductive connector to the circuit carrier while providing electrical communication between the at least one sensor and the electric circuit.

One advantage of the present invention is that by piercing the circuit carrier and electric circuit, the at least one deformable blade establishes a more robust mechanical and electrical connection for the sensor. Advantageously, this improved connection increases the potential operating life of the vehicle occupant sensing system.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
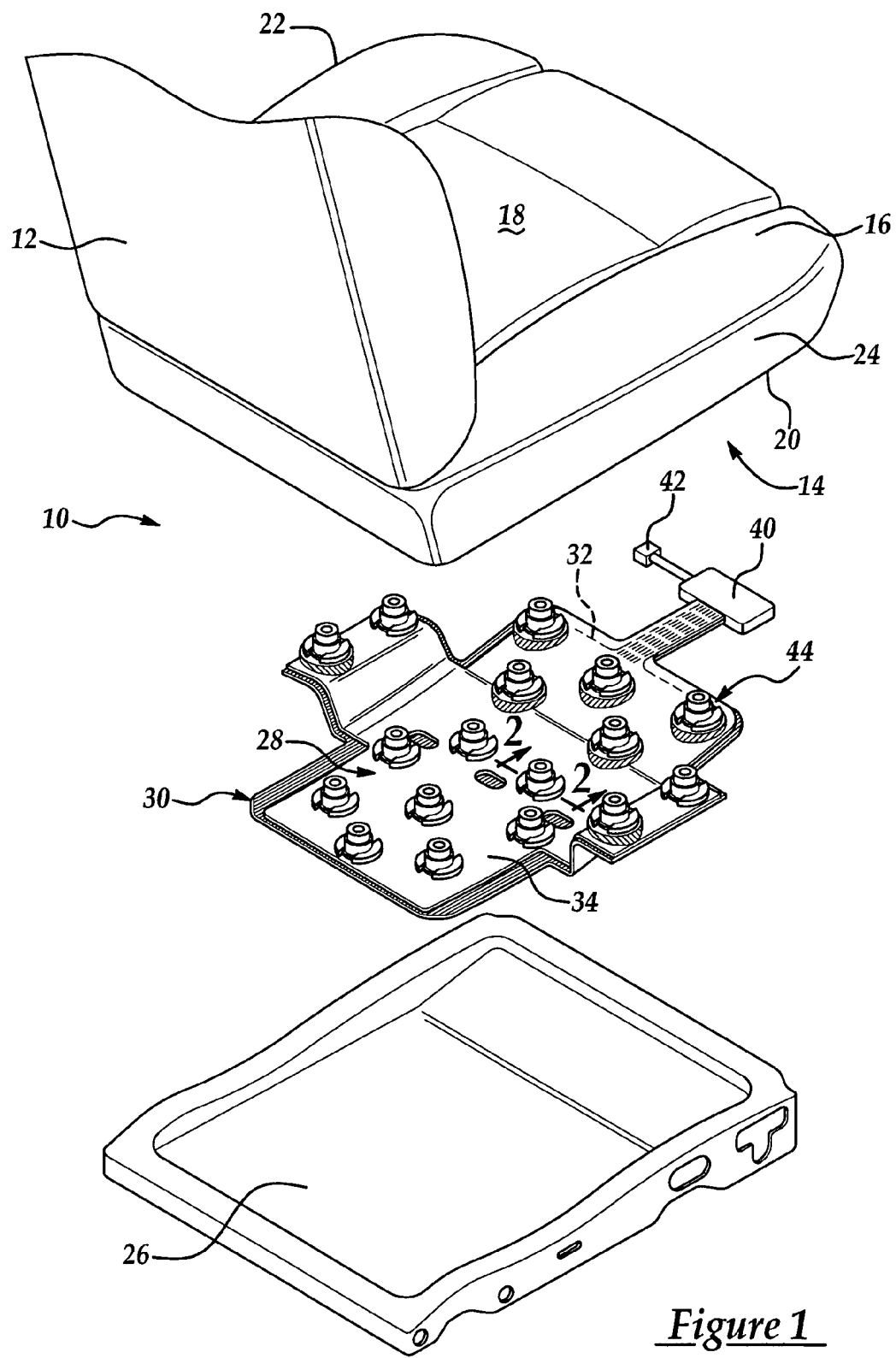
FIG. 1 is an exploded view of a vehicle seat assembly illustrating one embodiment of the vehicle occupant sensing system of the present invention.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, whether the occupant is above or below a certain weight requirement or whether the occupant is sitting in a certain position.

Figure 3A:
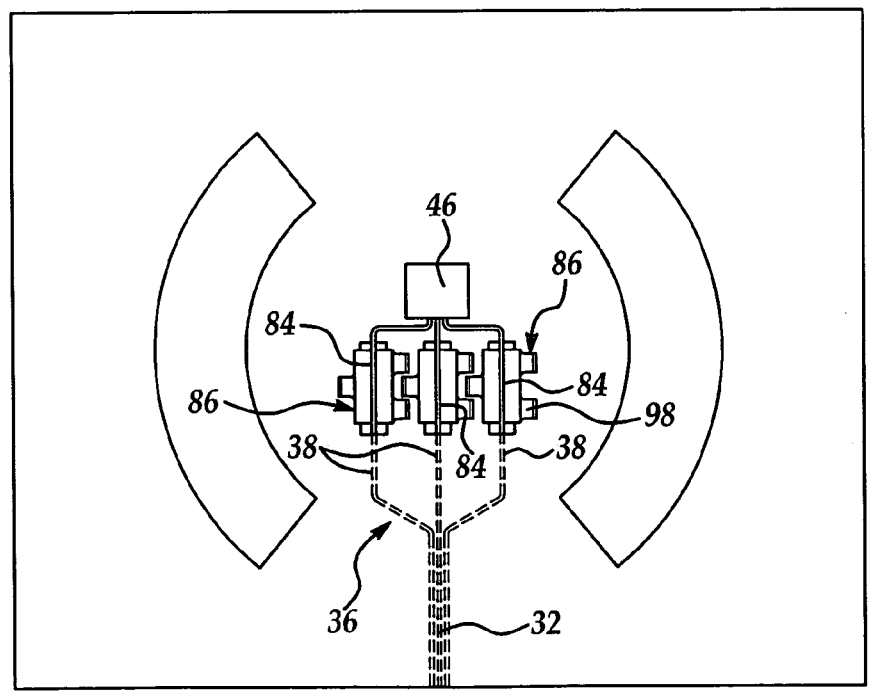
FIG. 3A is a top plan view of the sensor employed in conjunction with the sensor assembly and illustrating the conductive connector mounted to the circuit carrier and operatively adapted for establishing electrical communication with each terminal of the sensor.
Figure 3B:
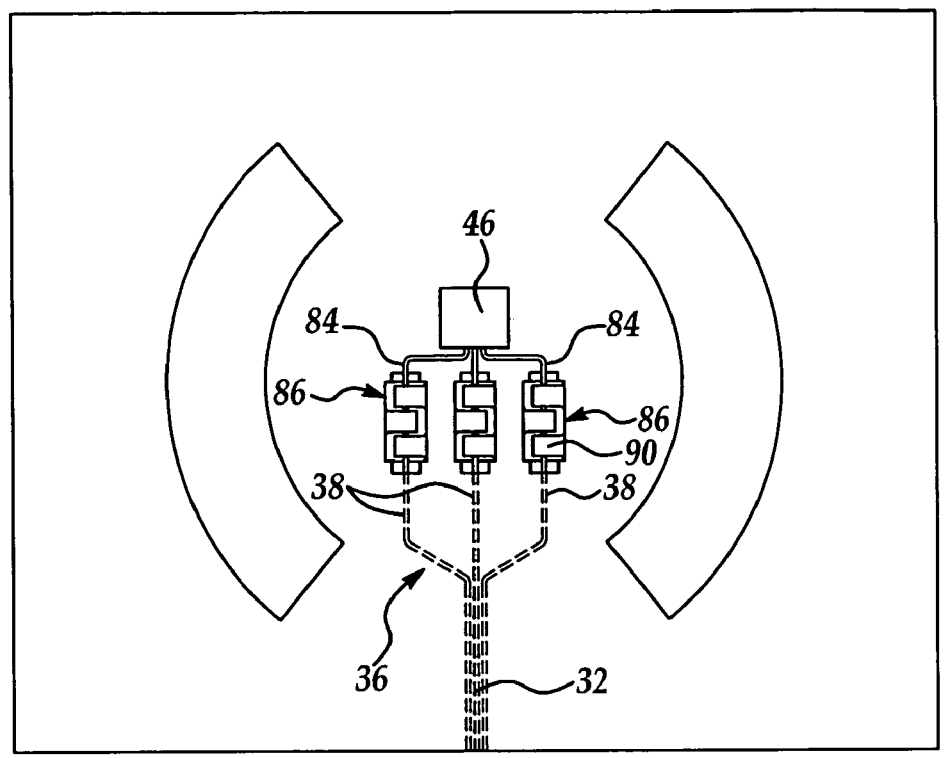
FIG. 3B is a top plan view of the sensor employed in conjunction with the sensor assembly and illustrating the conductive connector mounted to the circuit carrier and operatively establishing electrical communication with each terminal of the sensor.

The sensing system 28 includes a circuit carrier tray, generally indicated at 30, that is supported by the seat pan 26. The vehicle occupant sensing system 28 also includes an electric circuit 32, which, in turn, is supported by a circuit carrier 34. The circuit carrier 34 is made of a thin nonconductive and corrosion-resistant material, and it encapsulates known electrical components that form the electric circuit 32. For instance, in one embodiment, a flexible printed circuit forms the circuit carrier 34 and electric circuit 32. The tray 30 supports the circuit carrier 34. The electric circuit 32 has a plurality of terminal ends 36 spaced intermittently about the circuit carrier 34, one of which is shown in FIGS. 3A and 3B. Each of the terminal ends 36 of the electric circuit 32 presents a plurality of leads 38 discussed in greater detail below. In the embodiment shown in FIG. 3A and 3B, there are three leads 38 at each terminal end 36, each embedded within the nonconductive material of the circuit carrier 34.

The electric circuit 32 is electrically connected to a controller schematically illustrated at 40 in FIG. 1. As described in greater detail below, the electric circuit 32 carries electric signals generated by the vehicle occupant sensing system 28 to the controller 40. The controller 40 is electrically attached to a restraint system, schematically illustrated at 42 in FIG. 1. The restraint system 42 can be of many types, such as an air bag system, and the controller 40 sends output to the restraint system 42 based on the signals delivered by the electric circuit 32. Although an airbag restraint system is discussed here, one having ordinary skill in the art will recognize that the type of restraint system 42 connected to the controller 40 does not limit the scope of the present invention.

As shown, the system 28 also includes a plurality of low profile sensor assemblies 44 that are supported by the tray 30, below the lower surface 20 of the seat cushion 16. In one embodiment not shown, the lower surface 20 includes a plurality of depressions, and each of the low profile sensor assemblies 44 are spaced according to a corresponding depression formed in the lower surface 20 of the seat cushion 16.

A sensor 46 is operatively fixed relative to each of the low profile sensor assemblies 44. The sensor 46 is in electrical communication with the electric circuit 32 as will be described in greater detail below. The low profile sensor assemblies 44 each cooperatively operate with the associated sensors 46 to detect a condition of the vehicle seat 10 as will be described in greater detail below. For example, the low profile sensor assemblies 44 and sensors 46 can operate to detect that the vehicle seat 10 is unoccupied, is occupied by a person of a particular weight, or is occupied by a person sitting in a particular position.

Figure 2:
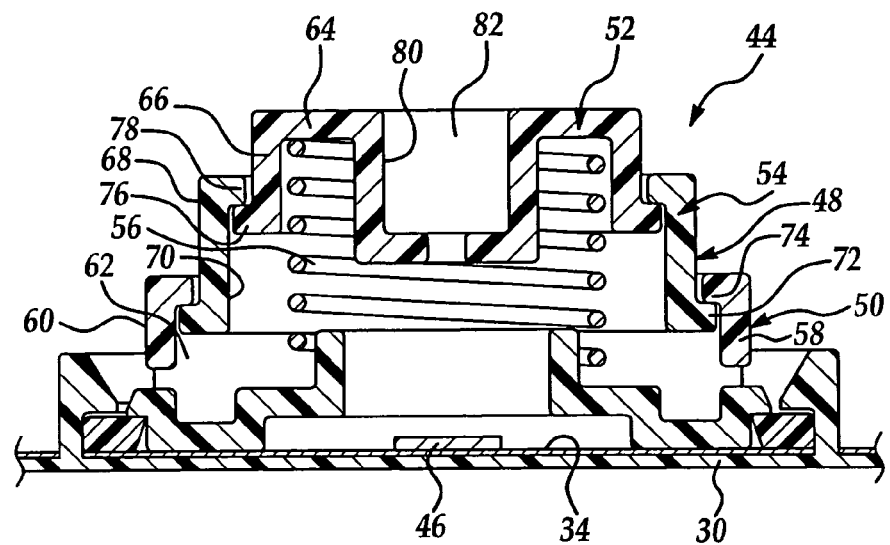
FIG. 2 is a cross-sectional side view of the sensor assembly employed in the vehicle occupant sensing system of the present invention taken along line 2—2 of FIG. 1.

Turning now to FIG. 2, one embodiment of the low profile sensor assembly is generally indicated at 44. The low profile sensor assembly 44 generally includes a housing 48, having a base 50, an upper slide member 52, and an intermediate guide member 54 disposed between the upper slide member 52 and the base 50. The upper slide member 52 and the intermediate guide member 54 are both supported for movement toward and away from the base 50. A biasing member 56 acts to bias the upper slide member 52 and intermediate guide member 54 away from the base 50 as will be described in greater detail below.

In the preferred embodiment illustrated in these figures, the base 50 includes a base guide 58, which is shaped like a hollow tube so as to define a wall 60 with a bore 62 extending axially therethrough. The upper slide member 52 includes an upper disc portion 64 and a support wall 66 extending axially downward from the outer circumference of the upper disc portion 64. The support wall 66 has a smaller diameter than the diameter of the intermediate guide member 54 such that the upper slide member 52 can move axially through the intermediate guide member 54. The biasing member 56 is disposed between the base 50 and the upper disc portion 64 of the upper slide member 52.

The intermediate guide member 54 is operatively supported for axial movement between the upper slide member 52 and the base 50. To this end, the intermediate guide member 54 is substantially tubular so as to define an outer surface 68 and an inner surface 70. The diameter of the intermediate guide member 54 is smaller than the diameter of the bore 62 of the base guide 58 such that the intermediate guide member 54 can move axially through the bore 62.

The intermediate guide member 54 includes a lower flange 72 formed on its lower end, and the base 50 includes an upper flange 74 formed on the upper end of the base guide 58. In the embodiment shown, the lower flange 72 of the intermediate guide member 54 extends radially outward, and the upper flange 74 of the base 50 extends radially inward. The diameter of the lower flange 72 is larger than the diameter of the upper flange 74. As such, the intermediate guide member 54 can be positioned within the bore 62 of the base guide 58. As the lower flange 72 of the intermediate guide member 54 slides toward the upper flange 74, the upper flange 74 interferes with the lower flange 72, thereby inhibiting further upward movement of the intermediate guide member 54. Thus, the upper flange 74 on the base 50 and the lower flange 72 on the intermediate guide member 54 cooperate to define the limit of sliding movement of the intermediate guide member 54 away from the base 50.

The upper slide member 52 includes a lower flange 76 formed on its lower end. On the other hand, the intermediate guide member 54 includes an upper flange 78 formed on its upper end. In the embodiment shown, the lower flange 76 of the upper slide member 52 extends radially outward, and the upper flange 78 of the intermediate guide member 54 extends radially inward. The diameter of the lower flange 76 is larger than the diameter of the upper flange 78. As such, the upper slide member 52 can be positioned within the intermediate guide member 54. As the lower flange 76 of the upper slide member 52 slides toward the upper flange 78 under the influence of the biasing force generated by the biasing member 56, the upper flange 78 interferes with the lower flange 76, thereby inhibiting further upward movement of the upper slide member 52. Thus, the upper flange 78 on the intermediate guide member 54 and the lower flange 76 on the upper slide member 52 cooperate to define the limit of sliding movement of the upper slide member 52 away from the base 50.

Furthermore, the upper slide member 52 includes a retainer 80 extending in the general direction of the base 50. In the embodiment shown, the retainer 80 is cup-shaped and extends from the center of the upper disc portion 64 of the upper slide member 52 in the direction of the base 50. In the embodiment shown in FIGS. 3 and 4, an emitter 82, such as a magnet, is operatively contained in and supported by the retainer 80.

As noted above, the vehicle occupant sensing system 28 further includes at least one sensor 46. As best shown in FIGS. 2, 3A, and 3B, the sensor 46 is operatively supported by the circuit carrier 34 adjacent the sensor assembly 44. In the embodiment shown here, the sensor 46 is positioned below the base 50 of the sensor assembly 44 above one of the terminal ends 36 of the electric circuit 32. The sensor 46 can be one of many types, including but not limited to a Hall effect sensor. If the sensor 46 is a Hall effect sensor, it detects the change in magnetic flux caused by the movement of the emitter 82 within the upper slide member 52 of the sensor assembly 44, and the sensor 46 generates a signal correlative of this change in magnetic flux. In this way, the sensor 46 is adapted to detect a condition of the vehicle seat assembly 10, such as whether or not it is occupied or whether the occupant is sitting in a certain position, based on the response of the sensor assembly 44. The signals generated by the sensor 46 are carried through the electric circuit 32 to the controller 40, which sends output to the restraint system 42 based on the signals generated by the sensor 46.

The weight of an occupant will deform the seat cushion 16 such that the lower surface 20 of the seat cushion 16 pushes the upper slide member 52 toward the base 50. As the upper slide member 52 moves, the sensor 46 detects an increase in magnetic flux density generated by the approaching emitter 82. In this way, the sensor 46 is operable to detect movement of the upper slide member 52 toward and away from the base 50. In turn, the sensor 46 generates a responsive signal indicative of the increase in flux density, and the controller 40 sends output to the restraint system 42 based on these signals. In the preferred embodiment, the sensor assemblies 44 are of the type described in detail in applicant's co-pending patent application Ser. No. 10/748,536, entitled "Vehicle Occupant Sensing System Having a Low Profile Sensor Assembly," and which is incorporated herein in its entirety by reference.

As shown in FIGS. 3A and 3B, each sensor 46 includes a plurality of terminals 84. The number of terminals 84 of each sensor 46 corresponds to the number of leads 38 presented by each terminal end 36 of the electric circuit 32. Thus, in the embodiment shown, each sensor 46 has three terminals 84, including a power, ground, and signal terminal 84, and they are each vertically aligned with one of the three leads 38 of the associated terminal end 36 of the electric circuit 32.

Figure 4:
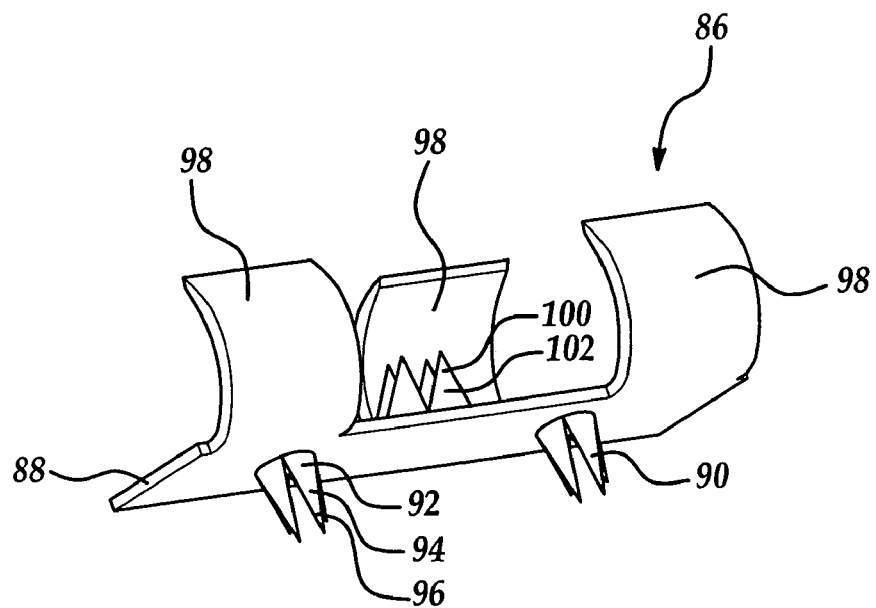
FIG. 4 is a bottom perspective view of a conductive connector used in the vehicle occupant sensing system of FIG. 1.

Moreover, the vehicle occupant sensing system 28 includes a plurality of conductive connectors, generally indicated at 86, associated with the corresponding plurality of terminals 84 and leads 38. A typical conductive connector 86 is shown in detail in FIG. 4. Each conductive connector 86 is made out of an electrically conductive material. The conductive connectors 86 each include a flat body 88 with at least one deformable blade 90 extending from the bottom of the body 88. Each deformable blade 90 defines a first portion 92 nearest the body 88, a second portion 94 near the middle of the blade 90, and a third portion 96 furthest from the body 88 and formed into a sharp tip as is shown in FIGS. 4 and 5C. In the embodiment shown, the conductive connector 86 includes eight deformable blades 90, arranged in two spaced circular groups of four blades 90.

Also, the conductive connector 86 includes at least one arm 98 extending from the side of the body 88, and in the embodiment shown, the conductive connector 86 includes three arms 98. Two of the arms 98 extend from one side of the conductive connector 86 while another arm 98 extends from an opposite side of the conductive connector 86. The conductive connector 86 also has a bending member, generally indicated at 100. In the preferred embodiment, the bending member 100 includes a circular arrangement of four prongs 102 extending from the top side of the body 88 of the conductive connector 86.

As shown in FIGS. 3A & 3B, a single conductive connector 86 is positioned near each terminal 84 of each sensor 46. The conductive connector 86 is positioned such that the top side of the body 88, the arms 98, and the bending member 100 are disposed for electrical communication with the associated terminal 84 and the deformable blades 90 extend into the circuit carrier 34 and into electrical communication with the associated lead 38 of the electric circuit 32, thereby mechanically attaching the conductive connector 86 to the circuit carrier 34 while providing electrical communication between the sensor 46 and the electric circuit 32.

FIGS. 3A, 3B, 5A, 5B, and 5C illustrate one embodiment of a method of manufacturing the vehicle occupant sensing system 28 involving the conductive connectors 86. As will be described in greater detail below, the method generally includes extending the first portion 92 of each blade 90 into and through the circuit carrier 34 and into electrical communication with the associated lead 38 of the electric circuit 32, bending the second portion 94 of each blade 90, and extending the third portion 96 of each blade 90 into the circuit carrier 34 and into electrical communication with the associated lead 38 of the electrical circuit 32. Once the conductive connector 86 is attached, the terminals 84 of the sensor 46 are attached to the conductive connector 86 as will be described in greater detail below.

Figure 5A:
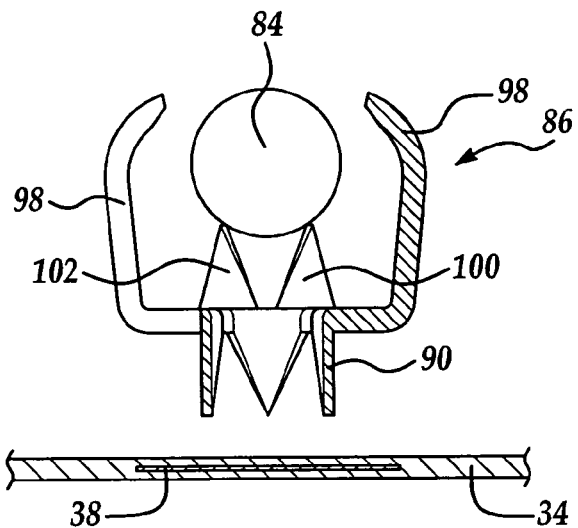
FIG. 5A is a cross-sectional side view of the conductive connector shown prior to attachment to a circuit carrier of the vehicle occupant sensing system of the present invention.
Figure 5B:
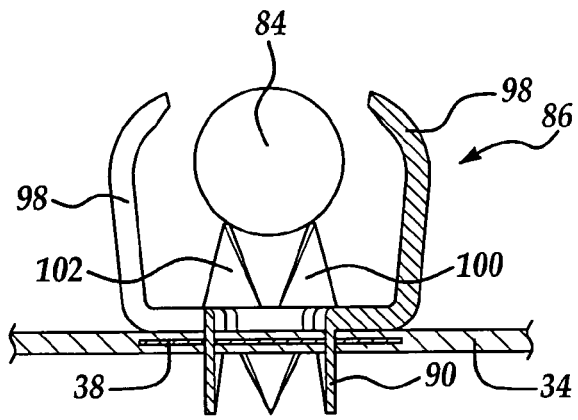
FIG. 5B is a cross-sectional side view of the conductive connector illustrating the deformable blades after they have initially pierced the circuit carrier of the vehicle occupant sensing system of the present invention.
Figure 5C:
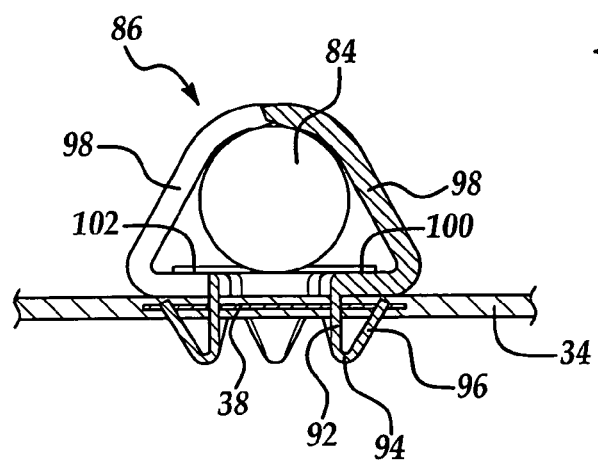
FIG. 5C is a cross-sectional side view of the conductive connector fully attached to the circuit carrier of the vehicle occupant sensing system of the present invention.

FIG. 5A illustrates the first step in attaching the conductive connector 86 to the circuit carrier 34 and the electric circuit 32 contained therein. As shown, the body 88 of the conductive connector 86 is arranged such that the blades 90 are pointed toward the circuit carrier 34. Then as shown in FIG. 5B, the body 88 is pressed into the circuit carrier 24, and the blades 90 are sufficiently sharp enough to pierce and extend completely through the circuit carrier 34 and the associated lead 38 encapsulated therein.

In a subsequent manufacturing step shown in FIG. 5C, each blade 90 is bent outward from each other and upward toward the underside of the circuit carrier 34. This bending process is completed by known means such as through the use of an actuating anvil. Bending the blade 90 in this manner causes the blade 90 to re-pierce the circuit carrier 34 and establish a second point of electrical communication with the associated lead 38. Thus, as seen in FIG. 5C, the first portion 92 of each blade 90 extends into and through the circuit carrier 34 and into electrical communication with the associated lead 38 of the electric circuit 32. Also, the second portion 94 of each blade 90 is bent such that the third portion 96 extends into the circuit carrier 34 and into electrical communication with the associated lead 38 of the electric circuit 32.

Next, the prongs 102 of the bending member 100 are flattened against the body 88 of the conductive connector 86. In one embodiment, a single tool (not shown) flattens the prongs 102 as the blades 90 of the conductive connector 86 are inserted into the circuit carrier 34, and the prongs 102 are flattened against body 88 such that the top end of the body 88 is substantially uniform and flat.

Furthermore, FIGS. 3A, 3B, and 5C illustrate the attachment between the conductive connector 86 and the associated terminal 84 of the sensor 46. As shown specifically in FIG. 3A, the terminal 84 of the associated sensor 46 is positioned against the body 88 of the conductive connector 86. The arms 98 of the conductive connector 86 are each adapted to contact the associated terminal 84, and as such, the arms 98 are each bent around the terminal 84 as is shown in FIGS. 3B and 5C. As such, the arms 98 and the body 88 apply a compressive force on the associated terminal 84, thereby cooperatively establishing mechanical and electrical communication with the associated terminal 84.

Although FIGS. 3A through 3B and FIGS. 5A through 5C illustrate the conductive connector 86 attached to the circuit carrier 34 before the terminal 84 is attached to the conductive connector 86, a person having ordinary skill in the art will recognize that the terminal 84 of the sensor 46 may be attached to the conductive connector 86 before the conductive connector 86 is attached to the circuit carrier 34 without departing from the spirit of the invention.

As described, the connector 86 pierces the circuit carrier 34, and this mechanical connection is considerably stronger and more robust than solder attachments used in the prior art. Additionally, the connector 86 pierces the associated lead 38 of the electric circuit 32, and because this electrical contact point is surrounded by the non-corrosive material of the circuit carrier 34, this electrical connection is less likely to corrode and thus is more robust than exposed solder connections of the type known in the prior art. Advantageously, this improved mechanical and electrical connection increases the potential operating life of the vehicle occupant sensing system 28.

The preferred embodiment of the conductive connector 86 described herein includes eight blades 90. Each blade 90 establishes an electrical contact via its first portion 92 and its third portion 96, for a total of sixteen points of electrical contact between the conductive connector 86 and the associated lead 38. Thus, it is more likely that the conductive connector 86 will maintain electrical connection with the associated lead 38 because of these multiple points of electrical contact. For instance, if a third portion 96 of one of the blades 70 were to become dislodged from the circuit carrier 34, there would remain fifteen points of electrical contact between the conductive connector 86 and the associated lead 38. Thus, the vehicle occupant sensing system 28 is more likely to remain operational for longer periods of time.

Also, the preferred embodiment of the blade 90 of the connector 86 is embedded in the circuit carrier 34 along the first portion 92 and the third portion 96 of the blade 90. This redundancy provides an even more robust mechanical connection because forces can be distributed through the blade 90 more effectively. Additionally, the preferred embodiment of the conductive connector 86 has blades 90 arranged in two circular groups of four blades 90. It is more likely that the conductive connector 86 will remain attached to the circuit carrier 34 because forces can be distributed more effectively due to this arrangement. Thus, the vehicle occupant sensing system 28 is more likely to remain operational for longer periods of time.

Additionally, there are three arms 98 each mechanically and electrically attaching the associated terminal 84 to the conductive connector 86. This structural redundancy makes the connection more robust because loads can be distributed more effectively among the three arms 98, and also, if one of the arms 98 fails, the other two maintain the connection. Advantageously, this increases the operating life of the vehicle occupant sensing system 28.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle occupant sensing system for detecting a condition of a vehicle seat, said system comprising:
a circuit carrier and an electric circuit supported by said circuit carrier, said electric circuit presenting a plurality of leads;
at least one low profile sensor assembly having a housing that includes a fixed base, an upper slide member, and at least one intermediate guide member disposed between said upper slide member and said base, said upper slide member and said at least one intermediate guide member supported for movement toward and away from said fixed base in response to movement of said vehicle seat;
at least one sensor operatively supported by said circuit carrier and fixed relative to said upper slide member and said base and operable to detect movement of said upper slide member toward and away from said base, said at least one sensor including a plurality of terminals corresponding to said plurality of leads presented by said electric circuit; and
a plurality of conductive connectors associated with said corresponding plurality of terminals and leads, said conductive connectors each including a body disposed for electrical communication with the associated terminal and including at least one deformable blade extending into said circuit carrier and into electrical communication with the associated lead of said electric circuit, thereby mechanically attaching said conductive connector to said circuit carrier while providing electrical communication between said at least one sensor and said electric circuit.

2. A vehicle occupant sensing system as set forth in claim 1, wherein said at least one deformable blade comprises a first portion, a second portion and a third portion, and wherein said first portion extends into and through said circuit carrier and into electrical communication with the associated lead of said electric circuit, and said second portion is bent such that said third portion extends into said circuit carrier and into electrical communication with the associated lead of said electric circuit.

3. A vehicle occupant sensing system as set forth in claim 1, wherein said body of said conductive connector comprises at least one arm adapted to contact the associated terminal to thereby establish mechanical and electrical communication with the associated terminal.

4. A vehicle seat comprising:
a lower seat cushion including an upper surface and a lower surface spaced from said upper surface;
a circuit carrier disposed adjacent said lower surface of said lower seat cushion;
an electric circuit supported by said circuit carrier, said electric circuit presenting a plurality of leads;
at least one low profile sensor assembly having a housing that includes a fixed base, an upper slide member, and at least one intermediate guide member disposed between said upper slide member and said base, said upper slide member and said at least one intermediate guide member supported for movement toward and away from said fixed base in response to said lower surface of said seat cushion;
at least one sensor operatively supported by said circuit carrier adjacent said at least one low profile sensor assembly, said at least one sensor fixed relative to said upper slide member and said base and adapted to detect a condition of the vehicle seat based on the response of said at least one low profile sensor assembly, said at least one sensor including a plurality of terminals corresponding to said plurality of leads presented by said electric circuit; and a plurality of conductive connectors associated with said corresponding plurality of terminals and leads, said conductive connectors each including a body disposed for electrical communication with the associated terminal and including at least one deformable blade extending into said circuit carrier and into electrical communication with the associated lead of said electric circuit, thereby mechanically attaching said conductive connector to said circuit carrier while providing electrical communication between said at least one sensor and said electric circuit.

5. A vehicle seat as set forth in claim 4, wherein said at least one deformable blade comprises a first portion, a second portion and a third portion, and wherein said first portion extends into and through said circuit carrier and into electrical communication with the associated lead of said electric circuit, and said second portion is bent such that said third portion extends into said circuit carrier and into electrical communication with the associated lead of said electric circuit.

6. A vehicle seat as set forth in claim 4, wherein said body of said conductive connector comprises at least one arm adapted to contact the associated terminal to thereby establish mechanical and electrical communication with the associated terminal.

7. A method of manufacturing a vehicle occupant sensing system for detecting a condition of a vehicle seat, the vehicle occupant sensing system comprising:

a circuit carrier and an electric circuit supported by said circuit carrier, said electric circuit presenting a plurality of leads;

at least one low profile sensor assembly having a housing that includes a fixed base, an upper slide member, and at least one intermediate guide member disposed between said upper slide member and said base, said upper slide member and said at least one intermediate guide member supported for movement toward and away from said fixed base in response to movement of said vehicle seat;

at least one sensor operatively supported by said circuit carrier and fixed relative to said upper slide member and said base and operable to detect movement of said upper slide member toward and away from said base, said at least one sensor including a plurality of terminals corresponding to said plurality of leads presented by said electric circuit; and a plurality of conductive connectors associated with said corresponding plurality of terminals and leads, said conductive connectors each including a body disposed for electrical communication with the associated terminal and including at least one deformable blade;

wherein said method of manufacturing comprises the step:

a) extending said at least one deformable blade into said circuit carrier and into electrical communication with the associated lead of said electric circuit, thereby mechanically attaching said conductive connector to said circuit carrier.

8. A method of manufacturing a vehicle occupant sensing system as set forth in claim 7, wherein step (a) comprises the steps:

1) extending a first portion of said at least one blade into and through said circuit carrier and into electrical communication with the associated lead of said electric circuit;

2) bending a second portion of said at least one blade; and 3) extending a third portion of said at least one blade into said circuit carrier and into electrical communication with the associated lead of said electric circuit.

* * * * *